United States Patent Office 3,503,914
Patented Mar. 31, 1970

3,503,914
PETROLEUM WAX COMPOSITIONS CONTAINING ETHYLENE COPOLYMERS AND HIGH MOLECULAR WEIGHT POLYPROPYLENE
Leo W. Tyran, Lewiston, N.Y., assignor to E. I. du Pont de Nemours and Company, Wilmington, Del. a corporation of Delaware
No Drawing. Continuation-in-part of application Ser. No. 306,634, Sept. 4, 1963. This application July 3, 1967, Ser. No. 650,642
Int. Cl. C08f 45/52
U.S. Cl. 260—28.5                                    6 Claims

ABSTRACT OF THE DISCLOSURE

Petroleum wax compositions containing copolymers of ethylene/vinyl acetate, ethylene/ethyl acrylate, or ethylene/methyl methacrylate and high molecular weight polypropylene are provided. These compositions display improved heat-seal bond strength characteristics.

Relation to other applications

This application is a continuation-in-part of my copending application, Ser. No. 306,634, filed Sept. 4, 1963 and now abandoned.

Background of invention

It is known that the addition of ethylene/vinyl acetate (E/VA) copolymers to petroleum wax compositions gives a significant improvement in heat-seal bond strength over unmodified petroleum wax. As little as 1 percent E/VA copolymer based on the total composition weight gives a measurable increase in bond strength, but for many applications a level of adhesion such as is obtained with 3 to 20 percent E/VA copolymer is desired. Petroleum wax compositions containing up to 40 percent E/VA copolymer are useful as adhesives. It is also known that not only does the amount of E/VA copolymer in the wax composition affect the heat-seal bond strength, but also the vinyl acetate content of the E/VA copolymer has a significant effect. Improved adhesion characteristics of wax compositions are observed over a range of copolymerized vinyl acetate content of from 15 to 35 percent by weight in the copolymer, but for optimum improvement, it is necessary to have a copolymerized vinyl acetate content within the critical range of 26.5 to 31.5 percent.

The molecular weight of the E/VA copolymer also affects the heat-seal strength of wax compositions containing the copolymer. In particular, the heat-seal characteristics are improved as the molecular weight increases. The molecular weight of the E/VA copolymers can be expressed in terms of their inherent viscosity as determined with 0.25 percent of the copolymer in toluene at 30° C. On this basis, E/VA copolymers having an inherent viscosity of 0.5 to 1.5 provide a significant improvement in heat-seal bond strength, and copolymers having an inherent viscosity of 0.8 or higher are the most effective. An alternate method to indicate molecular weight of the copolymers is by means of their melt indices, as determined by the tentative ASTM test method D1237-57T. The melt indices corresponding approximately to the above-listed inherent viscosities are as follows:

| Inherent viscosity | Melt index |
|---|---|
| 0.5 | 500 |
| 0.8 | 20 |
| 1.5 | 0.1 |

While the higher molecular weight E/VA copolymers, that is those having an inherent viscosity above about 0.8 or having a melt index of about 20 or below, are preferred from the standpoint of heat-seal bond strength, the high molecular weight materials give more viscous compositions when blended with petroleum wax. For certain applications it is desirable to have E/VA copolymer-wax compositions which possess the lower viscosity characteristics obtained with lower molecular weight E/VA copolymers, for example, those with a melt index of 100 to 200 and higher. However, such relatively lower molecular weight E/VA copolymers generally do not impart sufficient heat-seal bond strength to the resultant E/VA copolymer-wax compositions to be satisfactory for many applications. A means to increase the heat-seal bond strengths of wax compositions containing such low molecular weight E/VA copolymers would be desirable.

While E/A copolymers having the preferred vinyl acetate level and the preferred molecular weight range for high heat-seal bond strengths usually give the expected performance when added to the petroleum wax compositions which is satisfactory for many applications, under certain circumstances, variations in effectiveness are observed. While the cause for this is not completely understood, it may be due to differences in the polymer structure, such as variations in the molecular weight distribution, distribution of the vinyl acetate monomer units within the polymer chain, or the amount of long and short chain branching. Such differences in polymer structure may be caused by variations in the reaction conditions under which the E/VA copolymers are prepared, such as conditions of temperature, pressure, catalyst concentration, throughput rate, etc. A means to insure that the E/VA copolymers of the preferred composition and molecular weight would consistently give the expected superior heat-seal bonds would be highly desirable.

Moreover, differences in the structure or composition of the petroleum wax itself apparently have considerable effect upon the effectiveness of the E/VA copolymer to impart satisfactory heat-seal bond strength to the resultant composition. A particular E/VA copolymer which imparts satisfactory heat-seal bond strength to some waxes, often is considerably less effective when added to another specific petroleum wax. A means to insure the effectiveness of E/VA copolymers when added to various different petroleum waxes is desired.

Other ethylene copolymers known to be useful for improving the heat-seal bond strength of petroleum wax compositions include ethylene/ethyl acrylate (E/EA) and ethylene/methyl methacrylate (E/MMA) copolymers. Although these, E/EA and E/MMA copolymers impart a significant improvement in the heat-seal bond strength of petroleum wax, and petroleum wax compositions containing such copolymers are satisfactory for some uses, it is desired to provide an improvement in the performance of these copolymers.

Summary of invention

According to the present invention there is provided a heat-sealable adhesive composition comprising, by weight, (1) 60 to 99 percent, or preferably 80 to 97 percent, of petroleum wax and (2) 1 to 40 percent, or preferably 3 to 20 percent, of polymeric additives, said polymeric additives comprising (A) 80 to 99 percent of an ethylene copolymer containing 65 to 85 percent of copolymerized ethylene and 15 to 35 percent of a copolymerized member of the group consisting of vinyl acetate, ethyl acrylate, and methyl methacrylate, said ethylene copolymer having a melt index of 0.1 to 500, and (B) 1 to 20 percent of polypropylene having a melt index of 0.01 to 100, or preferably 0.01 to 20.

Description of invention

The three ethylene copolymers used in this invention, namely, ethylene/vinyl acetate, copolymer, ethylene/ ethyl acrylate copolymer, and ethylene/methyl methacrylate copolymer, herein are referred to collectively, for convenience, as "the ethylene copolymers."

The polypropylene used as a polymeric additive in this invention may be of any type so long as it has the required melt index of from 0.01 to 100. Steric regularity of the polypropylene is not critical to this invention. Therefore, the polypropylene may be atactic, isotactic, syndiotactic, or stereoblock, or a mixture thereof. The polypropylene may be prepared by any of the known methods of art, such as disclosed in Kresser, Polypropylene, Reinhold Publishing Corp., New York (1960), and U.S. Patent 3,051,690 issued to Vandenberg.

The polypropylene must be a high molecular weight material. By this is meant that the polypropylene must have a melt index, as determined by tentative ASTM test method D1238–57T (at 190° C., under 2160 gram load) within the range of 0.01 to 100, and preferably 0.01 to 20. The low molecular weight polypropylenes, which are often used as wax additives, and which have melt indices of greater than 1000, are totally unsuitable for use in this invention since they actually cause a reduction in heat-seal bond strength when incorporated into a petroleum wax composition containing one of the ethylene copolymers.

In order to effectively increase the heat-seal bond strength of a wax composition containing one of the ethylene copolymers of this invention, the polypropylene must be added in an amount within the range of 1 to about 20 percent, or preferably 2 to 15 percent, based on combined weight of polypropylene and ethylene copolymer. The desired significant improvement in heat-seal bond strength is not obtained when polypropylene is used in amounts outside of this specified range. In fact, use of polypropylene in amounts appreciably greater than about 20 percent has a deleterious effect on the heat-seal bond strength of the petroleum wax composition containing one of the ethylene copolymers.

It is quite surprising that polypropylene functions to improve the heat-sealing properties of petroleum wax compositions containing ethylene/vinyl acetate, ethylene/ethyl acrylate, or ethylene/methyl methacrylate copolymers, since these modified petroleum wax compositions exhibit much higher heat-seal bond strengths than do petroleum waxes containing only polypropylene as the modifier. The expected behavior would be to obtain a heat-seal bond strength intermediate between those obtained with polypropylene as the only modifier and with one of the ethylene copolymers as the sole modifier. This is indeed the result obtained when very low molecular weight polypropylene is used or when the amount of high molecular weight polypropylene is outside the ranges heretofore defined.

The ethylene/vinyl acetate, ethylene/ethyl acrylate, and ethylene/methyl methacrylate copolymers suitable for use in this invention can be prepared by methods which are well known in the art. For example, the methods described in U.S. Patents 2,200,429 and 2,703,794 may be used. The copolymers contain at least 65 percent ethylene and 15 to 35 percent of copolymerized vinyl acetate, ethyl acrylate, or methyl methacrylate and have melt indices within the range of 0.1 to 500. Polypropylene modification improves the heat-seal bond strengths obtainable with copolymers throughout these ranges of comonomer content and melt index, but for optimum results it is especially effective to use E/VA copolymers with a vinyl acetatae content of 26.5 to 31.5 percent and a melt index of 0.1 to 200.

The term "petroleum wax" as used herein refers to both paraffin and microcrystalline waxes. Paraffin wax, which is preferred for use in this invention, is a mixture of solid hydrocarbons derived from the overheat wax distillate fraction obtained from the fractional distillation of peteroleum. After purification, the paraffin wax contains hydrocarbons that fall within the formulas $C_{23}H_{48}$-$C_{35}H_{72}$. It is a substantially colorless, hard, and translucent material usually having a melting point of about 125–165° F. Microcrystalline wax is obtained from the nondistillable still residues from the fractional distillation of petroleum. It differs from paraffin wax in having branched hydrocarbons of higher molecular weights. It is considerably more plastic than paraffin wax and usually has a melting point of about 150–200° F.

The composition of this invention may be prepared in any convenient manner. The ethylene copolymer and the polypropylene may be pre-blended and then added to molten petroleum wax with agitation or the ethylene copolymer and the polypropylene may be added individually to the molten petroleum wax. The ethylene copolymer and polypropylene may be pre-blended by hot mixing the ingredients in a Banbury mixer, on a two-roll mill, in a compound extruder, or other such equipment. An especially convenient method is to add the polypropylene to the ethylene copolymer in the extruder which is commonly used in the last step in the manufacture of the ethylene copolymer to convert it to a physical form which is convenient to handle in subsequent operations, for example, incorporation into wax compositions.

The heat-sealable adhesive compositions of this invention have many applications in the paper industry for coating and laminating purposes, and can be used, for example, in the manufacture of wrapping papers for food packages and paper board cartons and drums.

This invention is further illustrated by the following examples in which all parts and percentages are on a weight basis. In the examples wherein a paper substrate was coated with a petroleum wax composition and the coated paper evaluated for heat-seal bond strength, the same procedure was followed in all the tests in order to assure comparable results. In these examples, for each test, a paraffin wax blend was prepared containing the indicated amounts of ethylene copolymer of this invention and polypropylene by heating the components together with agitation at a temperature of about 250–300° F. Unless indicated otherwise, the paraffin wax used in all these tests was a commercially available material having a melting range of 143–150° F. The molten paraffin wax composition at a temperature of 195–225° F. was then applied to both sides of a bread wrap paper on a Talboys T-Line laboratory coater, Model 1500C. The paper was a 25 lb./ream clay-coated (one side) sulfite stock. The coatings were applied at a web speed of 30 ft./min. and after coating, the paper was immediately quenched in water at 70° F. or below. The coating weights were maintained within the range of 13.5 to 16.0 lb./ream. Other studies have shown that differences in coating weights between these limits have no effect on the heat-seal performance of the coated paper.

Heat-seal bond strengths were determined by TAPPI Suggested Method T642SM–54, modified in that paper-to-paper seals were made between the pigmented sides of the two strips of paper coated as above instead of between the unpigmented sides as suggested by the TAPPI procedure. This modified procedure is more sensitive to small changes in heat-seal strength than the TAPPI method. The paper-to-paper seals were made on a Palo Myers sealer. The seal strengths were measured on an Instron Tensile Tester and the values reported represent the average of at least 5 and up to 9 measurements of the force in grams required to separate sealed strips of paper one inch wide.

Example 1

This example demonstrates the effect of the addition of a "normal" E/VA copolymer to wax, the addition of an "inferior" E/VA copolymer to wax, and the effect of the addition of polypropylene to these resultant E/VA copolymer-wax compositions. In this example, two different E/VA copolymers were used. One copolymer, Sample B, gave a relatively inferior performance when unmodified with polypropylene as compared to the other E/VA copolymer, Sample A. The Sample A E/VA copolymer had a copolymerized vinyl acetate content of 27.4% and a melt index of 13.4. The Sample B E/VA copolymer had a copolymerized vinyl acetate content of 29.2% and a melt index of 16.4. In Test 1 of this example, a composition consisting of wax and 10% of the Sample A E/VA copolymer was added. In Test 2, the wax contained solely 10% of the Sample B E/VA copolymer. In Test 3, the wax contained 10% of a blend of 90% of the Sample B E/VA copolymer and 10% of an atactic polypropylene having a melt index of 1.3. The compositions were prepared and heat-seal bond strengths were determined as indicated above. The results of this example are summarized in Table I:

TABLE I

| Test No. | Type of E/VA Copolymer | Percent Polymeric additives in composition | Percent polypropylene (based on E/VA+polypropylene) | Heat-seal bond strength g./in. |
| --- | --- | --- | --- | --- |
| 1 | Sample A | 10.0 | None | 173 |
| 2 | Sample B | 10.0 | None | 98±5 |
| 3 | Sample B | 10.0 | 10.0 | 202±9 |

These results show that while the Sample B E/VA copolymer was significantly inferior to the Sample A E/VA copolymer, substitution of 10% of the Sample B material with polypropylene increased the heat-seal bond strength performance of the "inferior" E/VA copolymer to a remarkable level, which was considerably higher than the performance of the unmodified Sample A E/VA copolymer. When 10% of this "normal" E/VA copolymer is substituted with polypropylene, the heat-seal bond strength of the resultant composition is raised to over 200 g./in. Thus, polypropylene may be used to significantly improve the performance of "normal" E/VA copolymers in accordance with this invention. A striking advantage of fortifying "normal" samples of E/VA copolymer is the reduced amount of combined polymer in wax required to achieve heat-seal strengths typically obtained with the "normal" E/VA copolymers at the 10% level in wax compositions. This reduced polymer content not only reduces the over-all cost of the modified wax composition but also lowers its melt viscosity, which is a highly desirable property.

Example 2

This example illustrates the comparative heat-seal bond strengths of an unmodified petroleum wax, the same petroleum wax containing 5% E/VA copolymer, and the petroleum wax containing a total of 5% of polymeric additives which consist of 90% E/VA copolymer and 10% polypropylene. The E/VA copolymer used was the Sample B, used in Example 1. The polypropylene used was the same as used in Example 1. The compositions were prepared and heat-seal bond strengths were determined as indicated above. The results of this example are summarized in Table II:

TABLE II

| Test No. | Percent polymeric additives in composition | Percent polypropylene (based on E/VA+polypropylene) | Heat-seal bond strength, g./in. |
| --- | --- | --- | --- |
| 1 | None | None | 13±0 |
| 2 | 5.0 | None | 23±0 |
| 3 | 5.0 | 10.0 | 61±6 |

As shown by these data, incorporation of 5% E/VA copolymer into the wax, increased the heat-seal bond strength from 13 to 23 g./in. However, use of 5% of a blend of 10% polypropylene and 90% E/VA copolymer was almost 3 times more effective than E/VA copolymer alone, since the heat-seal bond strength was increased from 13 to 61 g./in.

Example 3

This example shows comparative heat-seal bond strengths of petroleum wax compositions containing 15% of polymeric additives. In Test 1 of this example the wax contained solely 15% E/VA copolymer, while in Test 2 the wax contained 15% of a blend consisting of 90% E/VA copolymer and 10% polypropylene. The composition ingredients were the same as used in Example 2. The results of this example are shown in Table III:

TABLE III

| Test No. | Percent polymeric additives in composition | Percent polypropylene (based on E/VA+polypropylene) | Heat-seal bond strength, g./in. |
| --- | --- | --- | --- |
| 1 | 15.0 | None | 220±9 |
| 2 | 15.0 | 10.0 | 312±26 |

This example shows again the surprising effect obtained by the use of a small amount of polypropylene, in accordance with this invention, in a wax composition containing E/VA copolymer.

Example 4

This example demonstrates the comparative results obtained by the use of a different polypropylene than used in the preceding examples. In Test 1 of this example the wax composition contained solely 10% E/VA copolymer, while in Test 2 the wax contained 10% of a blend of 90% E/VA copolymer and 10% of an atactic polypropylene having a melt index of 8.4. The E/VA copolymer and wax used in this example were the same as used in Example 2. The results of this example are shown in Table IV.

TABLE IV

| Test No. | Percent polymeric additives in composition | Percent polypropylene (based on E/VA+polypropylene) | Heat-seal bond strength, g./in. |
| --- | --- | --- | --- |
| 1 | 10.0 | None | 98±5 |
| 2 | 10.0 | 10.0 | 189±9 |

Example 5

This example illustrates the criticality of the amount of polypropylene used in this invention. In Test 1 of this example the wax contained solely 10% E/VA copolymer, while in Test 2 the wax contained 10% of a blend of 70% E/VA copolymer and 30% of polypropylene. The composition ingredients were the same as used in Example 4. The results of this example are shown in Table V:

TABLE V

| Test No. | Percent polymeric additives in composition | Percent polypropylene (based on E/VA+polypropylene) | Heat-seal bond strength, g./in. |
| --- | --- | --- | --- |
| 1 | 10.0 | None | 98±5 |
| 2 | 10.0 | 30.0 | 26±1 |

As shown in Table V, the use of a blend of 70% E/VA copolymer and 30% polypropylene is far less effective than the use of a comparable amount of E/VA copolymer alone, as a polymeric wax additive.

Example 6

This example illustrates the criticality of the melt index of the polypropylene used in this invention. In Test 1 of this example the wax contained solely 10% E/VA copolymer, while in Test 2 the wax contained 10% of a blend of 90% E/VA copolymer and 10% of an atactic polypropylene having a melt index of about 1000. The E/VA copolymer and wax used in this example were the same as used in Example 2. The results of this example are shown in Table VI.

TABLE VI

| Test No. | Percent polymeric additives in composition | Percent polypropylene (based on E/VA+polypropylene) | Heat-seal bond strength, g./in. |
|---|---|---|---|
| 1 | 10.0 | None | 98±5 |
| 2 | 10.0 | 10.0 | 69 |

As shown by these data, the polypropylene having a low molecular weight (i.e., a high melt index) has a deleterious effect on the heat-seal bond strength of the wax composition containing E/VA copolymer.

Example 7

This example illustrates the use of an additional type of polypropylene. In Test 1 of this example the wax contained solely 10% E/VA copolymer, while in Test 2 the wax contained 10% of a blend of 90% E/VA copolymer and 10% of an isotactic polypropylene having a melt index of 16. It should be noted that in the preparation of the composition for Test 2, a considerable amount of polypropylene and some E/VA copolymer precipitated from the molten wax. Therefore, the results shown are for a composition which actually contained less than 10% polypropylene. The E/VA copolymer and wax were the same as used in Example 2. The reuslts of this example are tabulated in Table VII:

TABLE VII

| Test No. | Percent polymeric additives in composition | Percent polypropylene (based on E/VA+polypropylene) | Heat-seal bond strength, g./in. |
|---|---|---|---|
| 2 | 10.0 | None | 98±5 |
| 1 | 10.0 | 10.0 | 155±112 |

The significant beneficial effect of the use of an isotactic polypropylene is self-evident from these results.

Example 8

This example shows that the addition of polypropylene to E/VA copolymer-wax compositions overcomes variations in heat-seal performance resulting from the particular petroleum wax used. The E/VA copolymer used was Sample A from Example 1, and the polypropylene was atactic and had a melt index of 8.4. In Test 1 of this example, the wax used was the parffin wax having a melting point of 143–150° F. as used in the preceding examples. In Tests 2 and 3, the wax was a paraffin wax having a melting point of 136° F. The results of this example are shown in Table VIII:

TABLE VIII

| Test No. | Wax melting point, °F. | Percent polymeric additives in composition | Percent polypropylene (based on E/VA+polypropylene) | Heat-seal bond strength g./in. |
|---|---|---|---|---|
| 1 | 143–150 | 10.0 | None | 173 |
| 2 | 136 | 10.0 | None | 50±1 |
| 3 | 136 | 10.0 | 10.0 | 221±9 |

These results show that while the "normal" E/VA added to the wax used in Test 1 imparted a substantial heat-seal bond strength to the resultant composition, this same E/VA copolymer when added to the wax used in Test 2 was considerably less effective (by a factor of about 3.5). However, substitution of 10% of this E/VA copolymer with polypropylene resulted in a heat-seal bond strength which was considerably higher than obtained with the wax used in Test 1.

Example 9

This example illustrates the use of an ethylene/ethyl acrylate (E/EA) copolymer in accordance with this invention. In Test 1 of this example, the wax contained solely 5% of E/EA copolymer while in Test 2 the wax contained 5% of a blend of 90% E/EA copolymer and 10% polypropylene. The E/EA copolymer had an ethyl acrylate content of 19% and a melt index of 2.6. The wax and propylene were the same as used in Example 1. The results of this example are shown in Table IX:

TABLE IX

| Test No. | Percent polymeric additives in composition | Percent polypropylene (based on E/EA+polypropylene) | Heat-seal bond strength, g./in. |
|---|---|---|---|
| 1 | 5.0 | None | 47±8 |
| 2 | 5.0 | 10.0 | 76±7 |

As shown in Table IX, the incorporation of a small amount of polypropylene into a wax-ethylene/ethyl acrylate copolymer composition greatly increases the heat-seal bond strength of the composition.

Example 10

This example illustrates the use of larger proportions of polymeric additives than used in Example 9. In Test 1 of this example the wax contained solely 10% E/EA copolymer, while in Test 2 the wax contained 10% of a blend of 90% E/EA copolymer and 10% polypropylene. The composition ingredients were the same as used in Example 9. The results of this example are shown in Table X:

TABLE X

| Test No. | Percent polymeric additives in composition | Percent polypropylene (based on E/EA+polypropylene) | Heat-seal bond strength, g./in. |
|---|---|---|---|
| 1 | 10.0 | None | 96±12 |
| 2 | 10.0 | 10.0 | 190±12 |

The results of this example are readily apparent from these data.

Example 11

This example illustrates the use of an ethylene/methyl methacrylate (E/MMA) copolymer in accordance with this invention. In Test 1 of this invention the wax contained solely 10% E/MMA, while in Test 2 the wax contained 10% of a blend of 90% E/MMA and 10% polypropylene. The E/MMA copolymer contained 74.4% copolymerized ethylene, 24.2% copolymerized methyl methacrylate and 1.4% copolymerized methacrylic acid, and had a melt index of 2.1. The wax and polypropylene were the same as used in Example 1. The results of this example are shown in Table XI:

TABLE XI

| Test No. | Percent polymeric additives in composition | Percent polypropylene (based on E/MMA+polypropylene) | Heat-seal bond strength, g./in. |
|---|---|---|---|
| 1 | 10.0 | None | 67 |
| 2 | 10.0 | 10.0 | 206±8 |

These data show that the incorporation of a small amount of polypropylene into a wax-ethylene/methyl methacrylate copolymer composition greatly increases the heat-seal bond strength of the composition.

This invention has been described and illustrated in considerable detail. Many variations in these details which do not depart from the spirit and scope of this invention will be obvious to those skilled in the art. Therefore, it is to be understood that this invention is not intended to be limited except as defined by the appended claims.

I claim:

1. A heat-sealable adhesive composition comprising, by weight, (1) 80 to 97% of petroleum wax and (2) 3 to 20% of polymeric additives, said polymeric additives comprising (A) 85 to 98% of an ethylene copolymer containing 65 to 85% of copolymerized ethylene and 15 to 35% of a copolymerized member of the group consisting of vinyl acetate, ethyl acrylate, and methyl methacrylate, said ethylene copolymer having a melt index of 0.01 to 500, and (B) 2 to 15% of polypropylene having a melt index of 0.01 to 100.

2. The heat-sealable adhesive composition of claim 1 wherein the polypropylene has a melt index of 0.01 to 16.

3. The heat-sealable adhesive composition of claim 1 wherein the ethylene copolymer is ethylene/vinyl acetate.

4. The composition of claim 3 wherein the ethylene/vinyl acetate copolymer has a copolymerized vinyl acetate content of 26.5 to 31.5% and the polypropylene has a melt index of 0.01 to 16.

5. The heat-sealable adhesive composition of claim 1 wherein the ethylene copolymer is ethylene/ethyl acrylate.

6. The heat-sealable adhesive composition of claim 5 wherein the polypropylene has a melt index of 0.01 to 16.

References Cited

UNITED STATES PATENTS

| | | |
|---|---|---|
| 3,146,214 | 8/1964 | Jakaitis et al. |
| 3,189,573 | 6/1965 | Oken. |
| 3,205,186 | 9/1965 | Zaayenga. |
| 3,243,396 | 3/1966 | Hammer. |
| 3,258,319 | 6/1966 | Cox. |
| 3,322,708 | 5/1967 | Wilson. |

FOREIGN PATENTS

| | | |
|---|---|---|
| 620,375 | 5/1961 | Canada. |
| 652,645 | 9/1964 | Belgium. |

MORRIS LIEBMAN, Primary Examiner

P. R. MICHL, Assistant Examiner